(12) United States Patent
Eisen

(10) Patent No.: US 10,551,167 B2
(45) Date of Patent: Feb. 4, 2020

(54) METHOD AND DEVICE FOR POSITION DETECTION OF A MOVING MATERIAL WEB

(71) Applicant: Texmag GmbH Vertriebsgesellschaft, Thalwil (CH)

(72) Inventor: Juergen Eisen, Augsburg (DE)

(73) Assignee: Texmag GmbH Vertriebsgellschaft, Thalwill (CH)

( * ) Notice: Subject to any disclaimer, the term of this patent is extended or adjusted under 35 U.S.C. 154(b) by 0 days.

(21) Appl. No.: 15/787,753

(22) Filed: Oct. 19, 2017

(65) Prior Publication Data
US 2018/0106601 A1    Apr. 19, 2018

(30) Foreign Application Priority Data

Oct. 19, 2016 (DE) .......................... 10 2016 012 500

(51) Int. Cl.
| | |
|---|---|
| *G01B 11/00* | (2006.01) |
| *G01B 11/14* | (2006.01) |
| *B65H 20/00* | (2006.01) |
| *G01P 3/36* | (2006.01) |

(52) U.S. Cl.
CPC ............. *G01B 11/14* (2013.01); *B65H 20/00* (2013.01); *G01P 3/36* (2013.01)

(58) Field of Classification Search
None
See application file for complete search history.

(56) References Cited

U.S. PATENT DOCUMENTS

| | | | | | |
|---|---|---|---|---|---|
| 3,225,988 | A | * | 12/1965 | Drenning ........... | B65H 23/0204 226/19 |
| 3,570,735 | A | * | 3/1971 | Kurz .......................... | G05D 5/06 226/3 |
| 4,247,204 | A | * | 1/1981 | Merlen ..................... | H03K 4/56 250/559.49 |
| 4,580,894 | A | * | 4/1986 | Wojcik ...................... | G01P 3/36 356/28 |
| 4,848,632 | A | * | 7/1989 | Mack .................. | B65H 23/0216 226/18 |
| 5,572,433 | A | * | 11/1996 | Falconer .............. | B65H 23/046 226/2 |
| 5,667,123 | A | * | 9/1997 | Fukuda ................ | B65H 23/038 226/18 |
| 5,932,888 | A | * | 8/1999 | Schwitzky ......... | B65H 23/0216 250/559.12 |

(Continued)

Primary Examiner — Kara E. Geisel
Assistant Examiner — Jarreas C Underwood
(74) Attorney, Agent, or Firm — Joseph E. Maenner; Maenner & Associates, LLC

(57) ABSTRACT

In a method and a device for position detection of a material web (2), the position of the material web (2) is determined on the basis of a marking (13) provided thereon. This marking (13) is detected by a first sensor (4), which emits a position signal (33) proportional to the position of the marking (13). The material web (2) is furthermore detected by a second sensor (5), which emits a signal proportional to the velocity of the material web (2) transversely to the movement direction (8). An output signal (7), which represents position-proportional values of the material web (2) even when the position signal (33) fails, is then calculated from the velocity signal (54) and the position signal (33).

13 Claims, 2 Drawing Sheets

(56) References Cited

U.S. PATENT DOCUMENTS

| | | | | |
|---|---|---|---|---|
| 6,141,525 A * | 10/2000 | Tahara | ............... | B41J 11/007 399/303 |
| 6,289,729 B1 * | 9/2001 | Haque | ............... | B65H 23/0204 73/159 |
| 2001/0022899 A1 * | 9/2001 | Castelli | ............. | G03G 15/0152 399/9 |
| 2006/0129316 A1 * | 6/2006 | Park | .................... | G01C 21/36 701/431 |
| 2007/0001091 A1 * | 1/2007 | Wittmann | ............. | G01C 11/00 250/200 |
| 2008/0167810 A1 * | 7/2008 | Wildervanck | ......... | G01C 21/34 701/431 |
| 2011/0148695 A1 * | 6/2011 | Mizuochi | ............... | G01S 19/40 342/357.23 |
| 2014/0209655 A1 * | 7/2014 | Haque | ............... | B65H 23/0204 226/15 |

\* cited by examiner

METHOD AND DEVICE FOR POSITION DETECTION OF A MOVING MATERIAL WEB

CROSS-REFERENCE TO RELATED APPLICATION

The present application claims priority to German Patent Application no: DE 10 2016 012 500.4, filed Oct. 19, 2016, which is incorporated herein by reference in its entirety.

FIELD OF THE INVENTION

The present invention relates to a method for position detection of a material web moving in a movement direction, on which at least one marking is provided. The invention furthermore relates to a device for carrying out this method.

BACKGROUND OF THE INVENTION

EP 2 703 772 B1 discloses a method of the species. In this document, a moving material web is optically scanned in order to detect the position of a marking on the material web. This method has repeatedly proven itself in practice and forms the starting point of the present invention.

It would be beneficial to provide a method of the type mentioned in the introduction, which is distinguished by improved reliability. A device for carrying out this method is furthermore intended to be provided.

BRIEF SUMMARY OF THE INVENTION

The method according to the invention is used for position detection of a material web moving in a movement direction. At least one marking is provided on this material web. Here and in what follows, a marking is intended to mean a local modification of the material web applied intentionally onto the material web. Examples of a marking are elevations or depressions of the material web, printed markings, threads woven-in made of a different material or with a different colour, adhesively bonded strips, seams, outer edges, different magnetisations or magnetisabilities. This list, however, is merely exemplary and is not to be understood as definitive. In no case, however, is a marking intended to be understood as a surface modification applied randomly on the material web.

The marking is intended to be used in terms of its position as a criterion for the position detection. Besides the guiding criterion, however, it may also be used for other purposes, for example to produce creased edges or a particular optical impression. Accordingly, the position detection of the material web is intended to be determined with the aid of the position of the marking. There are many applications for this. Merely by way of example, it may be mentioned that, in the case of cardboard and composite packages, creases for folding the packaging often need to be introduced.

If the packaging is printed, however, the crease should be arranged to match the printed image, and not necessarily to match the web edge. To this end, however, it is necessary to feed the already printed web to a creasing machine with an aligned printed image. To this end, the material web is detected by at least one first sensor that produces a measurement signal dependent on the marking and emits therefrom at least one position signal proportional to the position of the marking. With the aid of this at least one position signal, the material web can in principle be guided. It has now been found that the marking detection may be unreliable because of a large number of circumstances. For example, the relevant marking may not be present over the entire length of the material web, so that the marking can be detected only at particular times.

Furthermore, the detection of the marking may be perturbed by external influences, in particular different lighting. The effect of all this is that, at particular times, it may not be possible to produce the position signal, or to produce it with the required accuracy. Particularly in applications in which this at least one position signal is delivered as an actual value to a regulator, this leads to significant stability problems of the control loop. In order to improve the reliability of the position detection of the material web, the latter is detected by at least one second sensor that detects at least one velocity component of the material web transversely to the movement direction. This at least one second sensor need not necessarily detect the aforementioned marking here. Rather, it may any desired properties of the material web for the detection.

These properties merely need to be configured in such a way that the velocity component of the material web transversely to its movement direction can be determined reliably therefrom. This obviates the need to produce an absolute value for the position. In the case of printed material webs, for example, the entire printed image may be used for the velocity detection. Besides this, however, any other desired methods are also possible for the velocity detection. This at least one second sensor emits at least one velocity signal proportional to the velocity component transversely to the movement direction of the material web, which signal is mathematically combined with the at least one position signal in such a way that at least one output signal is calculated therefrom. The calculation is in this case carried out in such a way that position-proportional values are produced for the at least one output signal even in the event of failure of the at least one position signal.

This may, in principle, be envisaged such that, for the case in which at least one correct position signal can be determined, the latter may also be used as at least one of the output signals. If a position signal cannot be determined, however, then with the aid of the at least one velocity signal the at least one output signal is recorrected until a position signal can again be produced, which is then in turn used directly as the output signal. In this way, failures of the position signal can be bridged without problems, so that regulation processing the at least one output signal can continue to operate without problems. In this way, the reliability of the position detection of the material web is improved significantly, and the applicability of the method is widened to markings which can be detected only with great difficulty. In this way, the accuracy of the position detection is also improved, since the desired guiding criterion can be used directly, which reduces errors.

In principle, it is entirely sufficient to detect the velocity of the moving material web one-dimensionally, so long as it contains at least one velocity component transverse to the material web movement direction. In addition, however, detection of the material web velocity in the movement direction of the material web may also be carried out, in order to use this information for further evaluations. In this way, web movement velocity can be detected very precisely, in order to control actuators accordingly. By comparison with a roller rotation speed, any adhesion loss of the moving material web may also be determined, in order to be able to implement corresponding countermeasures rapidly. Furthermore, the information about the material web velocity in the movement direction may also advantageously be used in order to adapt the maximum control speed. Under particular operating conditions, for example in the event of an adhesion loss of the material web, blocking of regulating elements may also be carried out in order to influence the material web movement, because these are no longer operating reliably under the described conditions. In this way, large regulating excursions can be avoided.

One simple, and at the same time reliable, way of producing the at least one velocity signal is obtained by detecting a displacement as a function of time of images of the material web. In this case, the moving material web is preferably scanned periodically, and corresponding images are produced. Successive images in this case exhibit a certain displacement, from which the velocity of the material web can be determined. Of this velocity, however, only the component that is oriented perpendicularly to the movement direction is required. As an alternative, the at least one velocity signal may also be produced by two-dimensional spatial filtering. In this case, for example, the filter effect of a CCD sensor or CMOS sensor is used. A lens in this case projects the moving material web onto pixels of the CCD sensor or CMOS sensor, which contribute to the output signal with alternating sign. Frequency components are then searched for in the output signal. The movement velocity in this case corresponds to the product of the imaging scale, the grid period of the sensor and the measured frequency. Particularly in the case of one-dimensional velocity detection of the moving material web, it is advantageous for the detection direction to make an acute angle with the web movement direction. This acute angle preferably lies in the range of between 30° and 60°, in particular 45°. By this measure, account is taken of the low web movement velocity to be expected transversely to the material web movement direction. Various velocity measuring systems require a minimum velocity, which can be achieved most simply by the said acute-angle setting.

As another alternative, the Doppler effect may also be used. In this case, a light beam, preferably from a laser, is directed onto the moving material web and analysed with frequency resolution. A frequency shift with respect to the incident light is produced because of the Doppler effect by the moving material web. This frequency shift is proportional to the material web velocity and may be used directly as a measure. This sensor variant is very simple to produce by installing a laser Doppler sensor in any desired sensor. As another alternative, however, self-modulating laser diodes may also be used. These produce a laser beam, which is reflected back on itself by the material web and in this way modulates the light production in the laser diode. In this way, a power modulation of the laser diode dependent on the material web velocity is obtained, which can be evaluated relatively simply. Such a velocity sensor is particularly economical, although the alignment with respect to the material web must be carried out very precisely.

One simple method for calculating the displacement as a function of time of the material web is obtained by a correlation analysis. In this case, various images of the material web are combined by means of a cross-correlation function, and the displacement of the images as a function of time is calculated from the maximum of this function. With a known time interval of the images, a value proportional to the velocity is obtained therefrom. In this case, the known or simply measurable material web velocity in the movement direction may optionally be used directly, so that the correlation analysis can be carried out essentially one-dimensionally. As an alternative, in the case of a two-dimensional cross-correlation, the value range to be calculated in the material web movement direction may be restricted accordingly in order to reduce the required computation outlay. In this way, it is also possible to detect slipping or sliding defects by comparison of the measured velocity with the roller rotation speed.

In order to be able to decide reliably whether the at least one position signal should be used directly or indirectly via the at least one velocity signal, it is advantageous for the at least one first sensor to emit at least one auxiliary signal which indicates the quality of the detection of the at least one marking. In the event of nondetection or erroneous detection of the at least one marking, this provides a simple way of deciding how the at least one output signal should be produced. Advantageously, the at least one auxiliary signal may be binary, since it is merely necessary to decide which of two ways of producing the at least one output signal is to be used.

In order to be able to use as effectively as possible the at least one position signal which has been determined, it is advantageous for it to be stored until a further reliable measurement value is detected by the at least one first sensor. In this case, the at least one auxiliary signal is preferably used in order to trigger the storage of the at least one position signal. The effect achieved in this way is that, for the case in which the at least one position signal fails or is unreliable, the last or at least one of the last reliable measurement values is available. Since it may in principle be assumed that the position of the material web changes only slightly, or slowly, with the aid of the at least one velocity signal the exact position of the material web can be calculated very accurately despite the failure of the at least one position signal. As an alternative, instead of the at least one position signal, the at least one position signal plus an integral of the at least one velocity signal may also be calculated. Preferably, the integral of the at least one velocity signal is in this case added starting at the time when the at least one marking of the material web is detected. This leads to an advantageous latency time compensation, which occurs for the evaluation of the at least one position signal. The output signal in this case follows the at least one marking of the material web almost directly, even though the calculation of the marking position may possibly take a significant time.

Very simple calculation of the at least one output signal is obtained when the stored position signal is used as initial value of an integration of the at least one velocity signal. At the moment of the failure of the at least one position signal, this integral simply gives the last stored measurement value of the at least one position signal. With an increasing displacement of the material web transversely to the movement direction, the at least one velocity signal is integrated up so as to in this way produce the at least one output signal. Although this integration becomes less and less accurate with increasing time, as soon as a new valid measurement value of the at least one position signal can again be determined this is in turn used directly as the output signal, only short times generally needing to be bridged. During these times, the at least one output signal delivers a sufficient dependency on the web profile, which is important particularly in the case of web movement regulation.

In order to achieve web movement regulation, it is advantageous for the at least one output signal to be used as an actual value. In this way, web profiles transversely to the movement direction of the material web can be compensated for reliably.

In order to carry out the method according to the invention, the following device has proven suitable. It has at least one first sensor for detecting a marking on a material web. It furthermore has at least one second sensor, which detects at least one velocity component of the material web transversely to the movement direction. These sensors are actively connected to at least one calculation circuit, which calculates at least one output signal from the at least one position signal and the at least one velocity signal. The at least one calculation circuit calculates the at least one output signal in such a way that, in the event of failure of the at least one position signal, position-proportional values can be determined by taking into account the at least one velocity signal.

For at least one of the sensors, a camera which produces an image of the moving material web has proven suitable. In the case of optically scannable material webs, this may also be used for both sensors. In this way, in particular, printed markings, elevations and depressions as well as creases can be detected. The three-dimensional structures are in this case, in particular, detected with the aid of the shadow effect in the case of obliquely incident light.

The calculation circuit preferably contains at least one integrator, which calculates the integral with respect to time of the at least one velocity signal with the at least one position signal as an initial value. This at least one integrator determines the integral over the velocity, which corresponds to a distance. Since the initial value of this integration is the last or one of the last of the at least one position signal, the at least one output signal of the at least one integrator follows the position of the material web. Particularly with the aid of digital calculation circuits, in particular microcontrollers, it is possible to produce an integrator with very little outlay and high precision.

It is furthermore favourable for the at least one calculation circuit to have at least one control input which, when there is a position signal, emits the latter instead of the integrated signal. This ensures that, in the presence of at least one position signal, the latter is emitted and the at least one integrator therefore plays no part. The velocity integration is only relevant in the event of failure of the at least one position signal, if no latency time compensation is carried out.

Lastly, it is advantageous for the device to be actively connected to at least one regulator. In this way, the output signal may be used as an actual value of the at least one regulator, in order to carry out web movement regulation. The latter maintains its function even when the actual controlled variable, namely the position of the at least one marking, is sporadically not present or not detectable.

BRIEF DESCRIPTION OF DRAWINGS

Other advantages and characteristics of this invention will be explained in the detailed description below with reference to the associated figures that contain several embodiments of this invention. It should however be understood, that the figure is just used to illustrate the invention and does not limit the scope of protection of the invention.

DETAILED DESCRIPTION OF THE INVENTION

Figure 1:
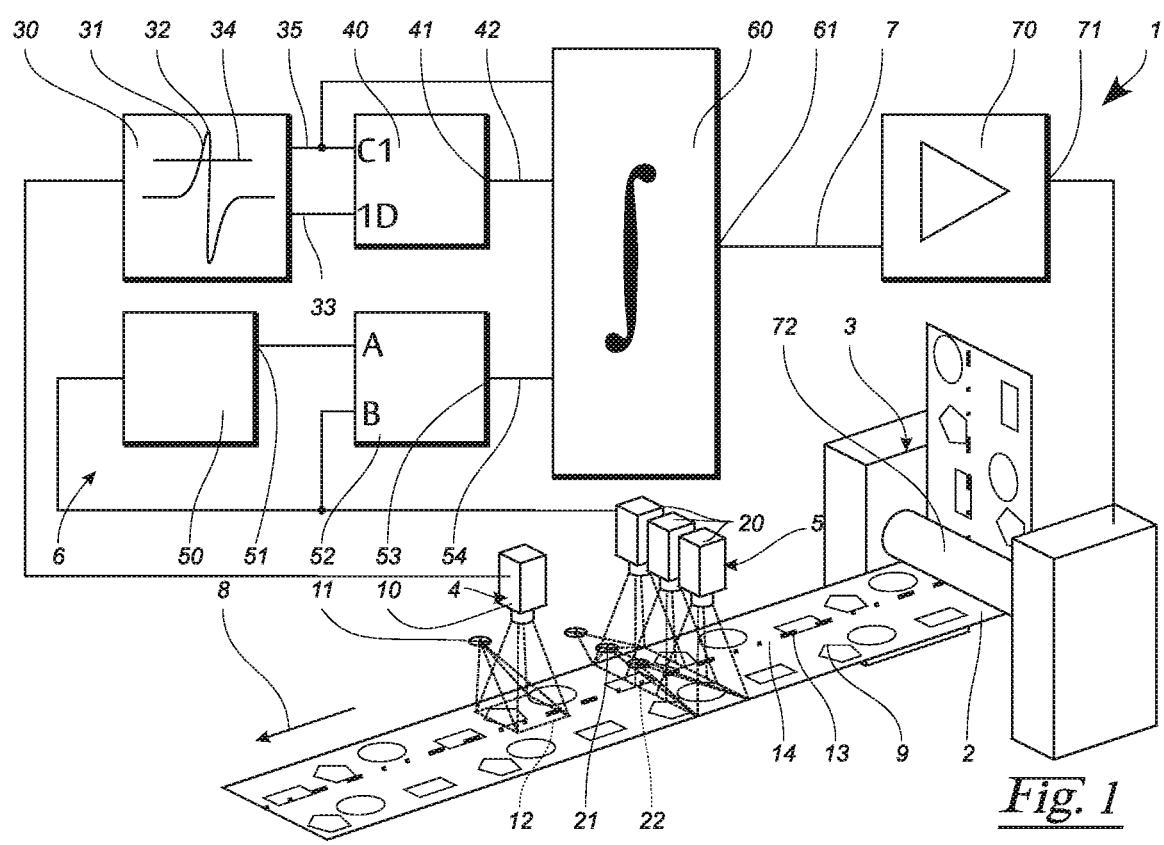
FIG. 1 shows a three-dimensional outline representation of a first embodiment of a device for position detection of a moving material web.

FIG. 1 shows a three-dimensional outline representation of a device 1 for position detection of a moving material web 2, as well as a web movement regulating device 3. The device 1 has a first sensor 4 and a second sensor 5, which detect the material web 2. These sensors 4, 5 are actively connected to a calculation circuit 6, which produces an output signal 7 therefrom. This output signal 7 is used as the actual value of the web movement regulating device 3, in order to guide the material web 2, which is being transported in the movement direction 8, transversely to the movement direction 8.

The first sensor 4 is formed by a camera 10 and an assigned light source 11. The camera 10 is arranged over the material web 2 in such a way that its acquisition range 12 detects a marking 13 applied on the material web 2. This marking 13 does not extend over the entire length of the material web 2, but instead has corresponding interruptions 14. These interruptions 14 are the reason why the first sensor 4 can detect the position of the marking 13 not at all times, but in principle only at such times at which the marking 13 actually lies in the acquisition range 12 of the camera 10. Wide limits are therefore placed on the choice of the marking 13. In particular, such properties of the material web 2, which it must have anyway in order to fulfil the subsequent intended use, may also be used as the marking 13. For example, the marking 13 may be a crease edge which is present only in particular regions of the material web 2. Besides this, many other markings 13 may be envisaged. This saves on the application of a marking in a region of the material web 2 outside the useful part. In addition, the alignment error of the material web with various aspects is reduced. If a material web 2 provided with a printed image is intended to be folded, for example, it is desirable to align the fold with the printed image. It is therefore in any event more accurate to use the printed image itself and not an additionally applied marking 13. The marking 13, which is not continuously present, does however make use of the marking 13 as a guiding criterion of the material web 2 difficult.

The material web 2 is scanned with the second sensor 5, which is formed by a number of cameras 20 that cover a large region of the material web—as viewed over its width. This camera 20 is in turn assigned a corresponding light source 21. An acquisition range 22 of the second sensor 5 in this case extends over the entire width of the material web 2. In simple cases, the acquisition range 22 may also be selected to be correspondingly smaller. What is important is merely that the second sensor 5 delivers a corresponding output signal 7 even in the event of an interruption 14 of the marking 13.

Output signals of the first sensor 4 and second sensor 5 are sent to the calculation circuit 6, which will be explained in more detail below. The calculation circuit 6 has a first image processing device 30, which besides optionally present filters essentially contains a line detector. This line detector operates, for example, according to the differential principle. In this case, the first derivative of the image obtained by the first sensor 4 is formed transversely to the movement direction 8, and the result is averaged in the web movement direction 8. If the marking 13 produces a high contrast with the surroundings of the material web 2, then a characteristic peak 31 is formed in the region of the marking, the position 32 of which peak is output as a position signal 33.

If the said peak 31 exceeds a certain minimum amplitude 34, this may be used as an indication of correct detection of the marking 13. In this case, the image processing device 30 will output a positive auxiliary signal 35. If the peak 31 does not exceed the minimum amplitude 34, however, this is regarded as an indication that either the marking 13 does not lie in the acquisition range 12 of the camera 10, or the evaluation is perturbed in another way. In each case, a negative signal is then output for the auxiliary signal 35. The auxiliary signal 35 can therefore be used by the further components of the calculation circuit 6 in order to decide whether or not correct detection of the marking 13 has taken place.

The image processing device 30 is actively connected to a memory device 40, supplied with both the position signal 33 and the auxiliary signal 35. This memory device 40 always stores the position signal 33 when there is a positive auxiliary signal 35. As soon as a negative auxiliary signal 35 is supplied to the memory device 40, however, storage of the position signal 33 no longer takes place, so that the last stored value of the position signal 33 is kept in the memory device 40. At an output 41, the memory device 40 emits a stored position signal 42, which is sent to the further components of the calculation circuit 6. In the event of correct detection of the marking 13, this stored position signal 42 corresponds to the position signal 33 and therefore represents the position of the marking 13. In the event of defective detection of the marking 13, however, the stored position signal 42 represents the last correctly detected value of the position signal 33.

The second sensor 5 is actively connected to an image memory 50. This image memory 50 stores the image of the cameras 20 and provides it at an output 51. The image memory 50 is coupled to the second sensor 5 in such a way that it is not the current image of the cameras 20, but the image produced previously that is available at its output 51. Both the cameras 20 and the output 51 of the image memory 50 are actively connected to a correlation device 52. At its inputs denoted as A and B, this correlation device 52 therefore receives on the one hand the current image and on the other hand the last obtained image of the cameras 20. The correlation device 52 calculates the following integral therefrom:

$$\iint dx dy A^*(x,y) B(x+\Delta x, y+\Delta y)$$

This integral gives a maximum for the displacement $\Delta x$, $\Delta y$ at which the best possible match between the current image and the stored image of the cameras 20 is achieved. In this case, the variation $\Delta y$ in the movement direction 8 plays no part, and what is important is merely the variation $\Delta x$ transversely to the movement direction 8. The variation $\Delta x$ is then divided by the elapsed time, so that the velocity of the material web 2 transversely to the movement direction 8 is thereby obtained. This value is output as a velocity signal 54 at an output 53.

The auxiliary signal 35, the stored position signal 42 and the velocity signal 54 are subsequently supplied to an integrator 60. This integrator 60 is constructed in such a way that, in the event of a positive auxiliary signal 35, it emits at its output 61 the stored position signal 42, which corresponds to the position signal 35. In the event of a negative auxiliary signal 35, the integration of the integrator 60 starts to run, the integration with respect to time over the velocity signal 54 being calculated. The integration is in this case carried out according to the following formula:

$$s + \int_0^T dt v(t)$$

Here, v is the velocity signal 54 and s is the stored position signal 42. The effect achieved in this way is that in the event of a negative auxiliary signal 35 the integrator 60 adds up the velocity signal 54, so that an output signal 7 at the output 61 follows the movement of the material web 2 transversely to the movement direction 8 even if detection of the marking 13 has not taken place. Immediately after the appearance of the negative auxiliary signal 35, the output signal 7 in this case still corresponds to the last position signal 33. Because of the substantially more inaccurate detection of the web position by means of the correlation device 52, however, the velocity signal 54 is substantially less accurate than the position signal 33. An error in the integrator 60 therefore becomes greater with increasing time, although this can generally be tolerated. As soon the marking 13 is detected again, the integrator 60 again emits the stored position signal 42 at its output 61 as the output signal 7. The described error of the integrator 60 therefore remains small in all cases in which the interruptions 14 of the marking 13 are sufficient short.

The output signal 7 of the calculation circuit 6 is actively connected to the web movement regulating device 3 via a web movement regulator 70. This web movement regulator 70 preferably has a PID behaviour and, with its output 71, controls positioning motors (not represented) of the web movement regulating device 3. These positioning motors cause swivelling of rollers 72, by which a force is exerted on the material web 2 transversely to the movement direction 8 in order to compensate for a deviation established in the web movement regulator 70. In this case, it is important for the output signal 7 of the calculation circuit 6 to have a constant dependency on the position of the material web 2 transversely to the movement direction 8 during operation of the web movement regulator 70. Otherwise, the risk would arise that the integral component of the PID regulating behaviour of the web movement regulator 70 would grow to arbitrarily large values and the web movement regulation would fail.

Figure 2:
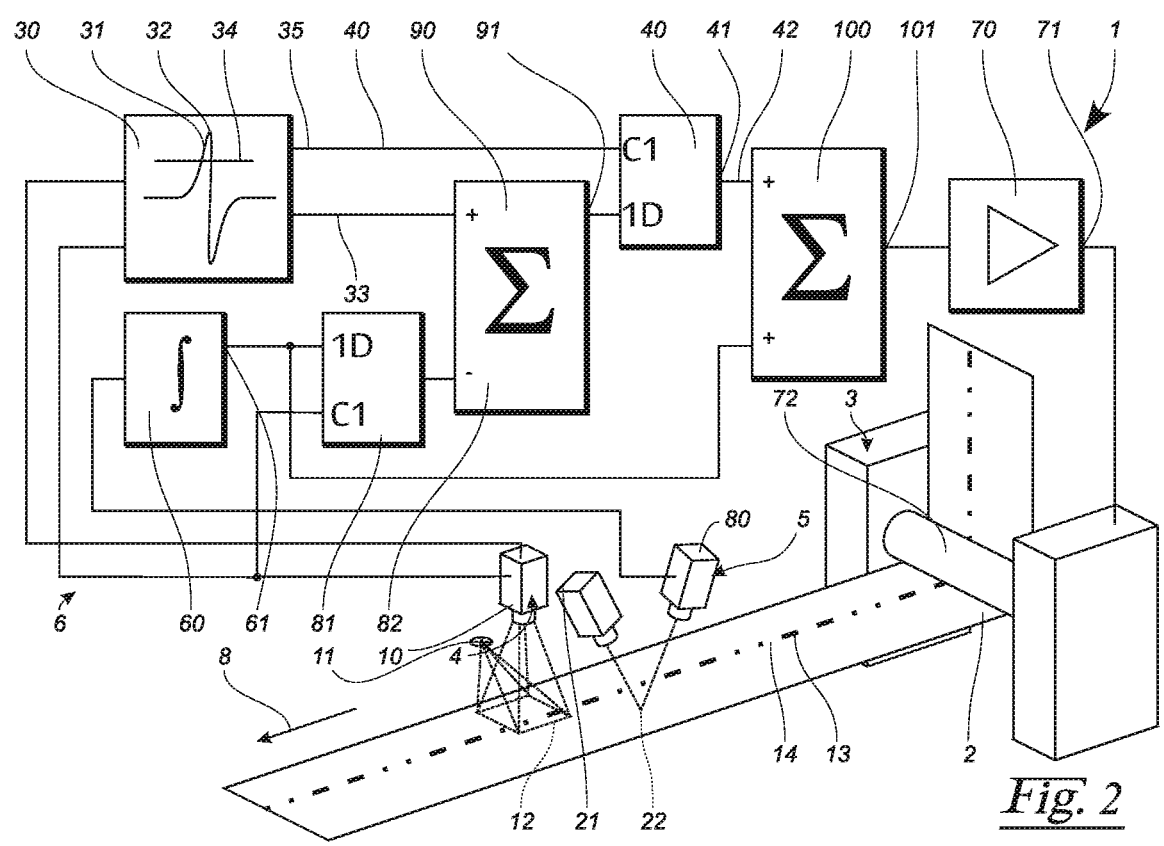
FIG. 2 shows a second embodiment of the device according to FIG. 1.

FIG. 2 shows an alternative embodiment of the device according to FIG. 1, with the same references denoting the same parts. Only the differences from the embodiment according to FIG. 1 will be discussed below.

In this embodiment, the second sensor 5 is formed not by a camera arrangement but by a Doppler sensor 80. To this end, the material web 2 is illuminated with the light source 21 in the form of a laser and frequency differences are detected two-dimensionally by the Doppler sensor 80. The respective velocity component of the material web 2 can be calculated directly from these frequency differences. This velocity signal is sent directly to the integrator 60, so that the latter calculates a position signal continuously from the velocity signal.

As an alternative, the second sensor 5 may also be formed by a self-modulating laser diode. This produces a laser beam, which is preferably directed perpendicularly onto the material web 2, so that light reflected by the material web 2 can be coupled back into the self-modulating laser diode. In this way, the light reflected by the material web 2 manipulates the light production in the laser diode, so that its power is modulated. This power modulation is dependent on the velocity of the material web 2, and may be used as a direct measure of the material web velocity. A particularly economical embodiment of the second sensor 5 is obtained in this way.

It is to be understood that, in a practical application of this circuit, the integrator 60 have an automatic reset which protects it from over will flow. This may, for example, be constructed in such a way that, when an upper threshold is exceeded or a lower threshold is fallen below, the integrator 60 is set to the value zero. In parallel therewith, however, this automatic reset must ensure that the memory devices 40, 81 described below are likewise corrected accordingly, so that the integrator reset has no repercussions on the result of the calculation circuit 6.

The output 61 of the integrator 60 is connected to a data input of a memory device 81. This memory device 81 stores the position value determined by the integrator 60 at the time of the marking detection. This time lies before the time at which the image processing device 30 was able to determine the position of the marking 13. In this case, it is to be taken into account that the calculations to be carried out by the image processing device 30 may sometimes be very elaborate, and consequently take a considerable amount of time.

The position signal 33 of the image processing device 30 is sent noninverted to a summator 90. Conversely, the integration value stored in the memory device 81, which was stored at the time of the marking detection, is sent inverted to the summator 90, so that the summator 90 calculates the difference of the two values. A value which corresponds to the position signal 33 determined by the image processing device 30 minus the integration value accumulated until the marking detection is therefore provided at an output 91 of the summator 90.

The output 91 of the summator 90 is actively connected to the memory device 40, which stores the said value at the output 91 of the summator 90 at the time of the completion of the calculations in the image processing device 30. Accordingly, the stored position signal 42 is provided at the output 41 of the memory device 40, this signal being sent noninverted to a further summator 100. The summator 100 is furthermore supplied with the noninverted output signal of the integrator 60, so that the summator 100 produces at its output 101 the sum of the stored position signal 42 and the value of the integrator 60 at the current time. Since the position signal 33 minus the integration value at the time of the marking detection is stored in the memory device 40, the summator 100 therefore calculates the position signal 33 plus the integral of the velocity signal since the detection of the marking 13.

The effect achieved by this somewhat complex measure is that, although a signal corresponding to the position signal 33 is applied at the output 101 of the summator 100, the output signal of the summator 100 does not however deliver the calculated value of the position signal 33, but instead a value of the position signal 33 calculated back to the time of the detection of the marking 13. The latency time caused by the image processing device 30 because of the time-consuming calculations is compensated for in this way. The signal at the output 101 of the summator 100 follows the position variation of the marking 13 almost directly and virtually without a perceptible time delay. In this way, the web movement regulator 70 can operate with substantially higher gain factors for the proportional-integral and differential components, so that the web movement regulation becomes significantly faster than with the conventional way of taking the latency time into consideration, without causing unattenuated oscillations.

The exemplary embodiments represented and described are merely preferred embodiments of the subject-matter of the invention. The invention and its protective scope are not, however, restricted to this embodiment. In particular, mixing of the various aspects and features of the individual embodiments is envisaged. For example, the latency time compensation of the calculation circuit according to FIG. 2 may also be used in the case of the sensors according to FIG. 1, and vice versa.

Since some of the embodiments of this invention are not shown or described, it should be understood that a great number of changes and modifications of these embodiments is conceivable without departing from the rationale and scope of protection of the invention as defined by the claims.

What is claimed is:

1. A method comprising a material web having a movement direction, a position transverse to said movement direction and at least one velocity component transverse to said movement direction, said material web being provided with at least one marking having a position, said position of said at least one marking being detected to determine said position of said material web, said detection of said at least one marking having a quality, said method further comprising at least one first sensor that produces at least one measurement signal dependent on said at least one marking and said at least one first sensor emits at least one position signal being proportional to said position of said at least one marking, said at least one first sensor emits at least one auxiliary signal which indicates said quality of said detection of said at least one marking, said method further comprising at least one second sensor detecting said velocity component of said material web and emitting at least one velocity signal being proportional thereto, said method emitting at least one output signal, which represents values being proportional to said position of said material web even in the event of time-limited failure of said at least one position signal of said first sensor, said output signal being calculated from said at least one position signal measured by said at least one first sensor and said at least one velocity component measured by said at least one second sensor said at least one auxiliary signal being analyzed and, in the case, said at least one auxiliary signal indicating good marking detection, said at least one output signal being equal to said at least one position signal of said at least one first sensor, and in the case, said at least one auxiliary signal indicating bad marking detection, said at least one output signal being calculated from said at least one velocity signal, using a prior sample of said at least one position signal corresponding to said at least one auxiliary signal indicating well marking detection as a starting point.

2. The method according to claim 1, wherein said material web having at least one further velocity component being directed in said movement direction and said at least one second sensor additionally detects said at least one further velocity component.

3. The method according to claim 1, wherein said at least on second sensor detects images of said material web, said images are compared with each other to calculate a displacement of images as a function of time and said at least one velocity signal is produced from said displacement by at least one of a two-dimensional spatial filtering, using a Doppler effect and by means of at least one self-modulating laser diode.

4. The method according to claim 3, wherein said displacement as a function of time is calculated by a correlation analysis of said images of said material web.

5. The method according to claim 1, wherein said at least one position signal is stored to achieve a stored position signal, and said at least one stored position signal remains unchanged so long as a reliable measurement value is not detected by said at least one first sensor, but said at least one stored position signal follows at least one of said position signal and said position signal plus an integral over time of said at least one velocity signal in the event of correct detection of said at least one marking.

6. The method according to claim 5 wherein said at least one velocity signal is integrated over time and said at least one stored position signal is used as initial value of said integration.

7. The method according to claim 1, wherein said material web is regulated in its position transversely to said movement direction and said at least one output signal being used as an actual value of said regulation.

8. A device comprising a material web, at least one first sensor, at least one second sensor and at least one calculation circuit, said material web having a movement direction, a position transverse to said movement direction and at least one velocity component transverse to said movement direction, said material web being provided with at least one marking, having a position, said first sensor detects said position of said marking, hereby producing at least one position signal being proportional to said position of said at least one marking, said detection of said at least one marking having a quality, said at least one first sensor emits at least one auxiliary signal which indicates said quality of said detection of said at least one marking, said at least one second sensor detects said at least one velocity component of said material web and emits at least one velocity signal being proportional to said at least one velocity component, said at least one first sensor and said at least one second sensor being actively connected to said at least one calculation circuit which calculates at least one output signal from said at least one position signal and said at least one velocity signal, said at least one output signal represents position-proportional values even in the event of failure of said position signal, said at least one auxiliary signal being analyzed and, in the case, said at least one auxiliary signal indicating good marking detection, said at least one output signal being equal to said at least one position signal of said at least one first sensor, and in the case, said at least one auxiliary signal indicating bad marking detection, said at least one output signal being calculated from said at least one velocity signal, using a prior sample of said at least one position signal corresponding to said at least one auxiliary signal indicating well marking detection as a starting point.

9. The device according to claim 8 herein said material web having at least one further velocity component being directed in said movement direction and said at least one second sensor additionally detects said at least one further velocity component.

10. The device according to claim 8 wherein at least one of said first and second sensors has at least one of a camera, a laser, a Doppler sensor and a self-modulating laser diode.

11. The device according to claim 8 wherein said at least one calculation circuit has at least one integrator, which calculates the integral with respect to time of said at least one velocity signal with said at least one position signal as initial value.

12. The device according to claim 10, wherein said at least one calculation circuit has at least one control input which, when there is a position signal, emits the latter instead of the integrated signal.

13. The device according to claim 8, wherein said device comprises at least one web movement regulator, being is actively connected to said calculation circuit.

* * * * *